United States Patent [19]
Peinemann et al.

[11] Patent Number: 6,050,380
[45] Date of Patent: Apr. 18, 2000

[54] FRICTION CLUTCH WITH A COMPENSATING SYSTEM

[75] Inventors: Bernd Peinemann, Niederwerrn; Reinhard Feldhaus, Ebenhausen; Matthias Fischer, Eltingshausen, all of Germany

[73] Assignee: Mannesmann Sachs AG, Schweinfurt, Germany

[21] Appl. No.: 09/075,645

[22] Filed: May 11, 1998

[30] Foreign Application Priority Data

May 9, 1997 [DE] Germany .............................. 197 19 506
Apr. 1, 1998 [DE] Germany .............................. 198 14 502

[51] Int. Cl.[7] .............................. F16F 15/16; F16D 3/80; F16D 3/70
[52] U.S. Cl. .................. 192/55.4; 192/30 V; 192/70.17; 192/208; 74/574; 464/24
[58] Field of Search .............................. 192/55.4, 70.17, 192/30 V, 208; 74/573 F, 574; 464/24

[56] References Cited

U.S. PATENT DOCUMENTS

| | | | |
|---|---|---|---|
| 1,906,925 | 5/1933 | Edwards | 74/574 |
| 3,641,839 | 2/1972 | Greeley | 74/574 |
| 4,295,386 | 10/1981 | Zhivotov . | |
| 4,314,486 | 2/1982 | Hellwig . | |
| 4,788,884 | 12/1988 | Reik et al. . | |
| 5,197,352 | 3/1993 | Haikawa | 74/574 |
| 5,295,411 | 3/1994 | Speckhart . | |
| 5,351,574 | 10/1994 | Hiraishi et al. | 74/574 |

FOREIGN PATENT DOCUMENTS

| | | |
|---|---|---|
| 36 30 398 | 5/1987 | Germany . |
| 36 43 272 | 6/1988 | Germany . |
| 145603 | 6/1941 | Japan . |
| 4-101844 | 2/1992 | Japan . |
| 604 528 | 10/1946 | United Kingdom . |
| 2 288 652 | 10/1995 | United Kingdom . |

Primary Examiner—Richard M. Lorence
Attorney, Agent, or Firm—Cohen, Pontani, Lieberman & Pavane

[57] ABSTRACT

A friction clutch for a motor vehicle is embodied with a centrifugal mass device, which has at least one mass-bearing compensating system. At least one component of the centrifugal mass device is equipped, to form the compensating system, with at least one chamber that holds, to a predetermined degree of fullness, a fluid medium, whose position in the chamber changes when a torsional vibration occurs. The effect resulting from this position change depends on the density and viscosity of the medium, on the one hand, and, on the other hand, on the arrangement of the chamber, which determines the vibrational behavior of the medium, the shape of the chamber, which determines the movement resistance, and its degree of fullness.

16 Claims, 10 Drawing Sheets

FRICTION CLUTCH WITH A COMPENSATING SYSTEM

BACKGROUND OF THE INVENTION

1. Field of the Invention

The invention relates to a friction clutch for a motor vehicle.

2. Discussion of the Prior Art

German reference DE 36 43 272 A1 discloses a friction clutch for a motor vehicle with a centrifugal mass device, which is equipped with a compensating centrifugal mass that serves as a mass-bearing compensating system. The compensating centrifugal mass is mounted in a freely rotatable fashion relative to the actual centrifugal mass and builds up, due to its mass inertia, a resistance moment when a torsional vibration is conveyed.

The compensating centrifugal mass is equipped with spring-mounted compensating weights, which are displaced from their rest positions in dependence on centrifugal force. The compensating centrifugal mass is therefore speed-dependent. However, this compensating centrifugal mass, because of its spring connection to the compensating weight, functions with sufficient effect only in those frequency ranges determined by the springs, and may fail in other frequency ranges.

U.S. Pat. No. 5,295,411 discloses a centrifugal mass device that, serving as a mass-bearing compensating system, accommodates a circular compensating centrifugal mass in each of a plurality of circular openings. The diameter of the compensating centrifugal mass is smaller than that of the opening. A centrifugal mass device of this type has the advantage that the displacement speed of the compensating centrifugal masses is dependent on speed changes on the centrifugal mass. Thus, torsional vibrations of a certain order (preferably, vibrations of the second order, in internal combustion engines with four cylinders) can be very effectively reduced at particular amplitudes by a certain amount. However, it is not possible to influence vibrations of a different order.

Both of the aforementioned devices belong to the technical genre of absorber. As already noted, absorbers of this type can be highly effective at certain resonance speeds or certain orders, but fail at other speeds or other orders. For this reason, it is often necessary to combine such an absorber with a torsional vibration dampers, such as that discussed in German reference DE 36 30 398 C1. This torsional vibration damper is embodied with a centrifugal mass device, which has a drive-side centrifugal mass and an output-side centrifugal mass rotatable relative thereto. The relative movement of the output-side centrifugal mass occurs in the event of displacement in the circumferential direction of coupling elements that act between the centrifugal masses and are thus actively connected to both centrifugal masses. These coupling elements consist of springs extending in the circumferential direction.

Torsional vibration dampers of the above type are suitable for filtering a complete frequency range, i.e., for damping amplitudes of different orders. Nonetheless, especially disturbing amplitudes of a certain order cannot be effectively suppressed, as is often required.

To improve the effectiveness of such a torsional vibration damper at certain frequencies or orders, it is possible to combine the torsional vibration damper with an absorber. However, given the compensating centrifugal masses located on the absorber, as well as the guide paths or joints that would be needed, a friction clutch embodied in this fashion would be heavy, large and extremely complicated in structure.

SUMMARY OF THE INVENTION

The object of the invention is to provide a mass-bearing compensating system for a friction clutch that, with an extremely simple structure, effectively performs an absorber function.

Pursuant to the present invention, the mass-bearing compensating system is embodied in a centrifugal mass device in the form of at least one chamber that holds a fluid medium at a predetermined degree of fullness. This fluid medium is to be used as a compensating centrifugal mass. To this end, a suitable chamber is embodied in a simple fashion on a given component of the centrifugal mass device, e.g., an individual centrifugal mass, a drive-side or output-side centrifugal mass in a two-mass flywheel, or a component of a clutch housing, e.g., a pressure plate. After being filled with the fluid medium, the chamber is then sealed. When the component of the centrifugal mass device that accommodates the compensating system is displaced as the result of a torsional vibration, a relative movement therefore occurs, due to the inertia of the fluid, between the fluid and the component in question, i.e., the fluid moves in a phase-offset fashion relative to the component that accommodates the chamber. Thus, without mechanical expense, a perfect absorber is created, requiring only a seal to protect against an outflow of the fluid medium.

Apart from the basic advantages of a mass-bearing compensating system of this type, it is also possible to exert considerable influence on the effect of the fluid medium by means of the position and shape of the chamber. For example, a chamber oriented substantially perpendicular to the rotational axis of the centrifugal mass device and having a course in the radially outer area that curves around a predetermined curvature center is able to act as follows: the fluid located in the chamber is effective to work a vibration around this curvature center with the radius that remains between the latter and the radial outer wall (which serves as the guide path) of the chamber. In this arrangement and embodiment of the chamber, the fluid medium is comparable to a mechanical compensating centrifugal mass that moves in a pendulum-like fashion around the curvature center. As a result, just as the case of a mechanical mass, a certain order of torsional vibrations can be at least reduced, independent of frequency. This positive effect can be further influenced by a suitable choice of fluid medium; when used as described, the fluid medium should preferably have a high mass density and a low viscosity. This is because the absorber effect can be enhanced by high mass density, while the relative movement between the component that accommodates the chamber and the fluid medium is favored by low viscosity. Moreover, the degree of fullness of the chamber also influences the absorption behavior of the fluid medium, because the lower the degree of fullness of the chamber, the larger the displacement movements to which the fluid medium can be subjected.

The advantageous effect of the displacement behavior of the fluid medium can be enhanced by embodying the chamber with a plurality of chamber parts that are in a fluid flow connection to one another. The fluid connection can be formed, for example, by the aforementioned radially outer guide path for the fluid medium, while the chamber parts can be legs that extend radially inward, relative to the rotational axis of the centrifugal mass device, from this fluid connection at a predetermined angle relative to the given radial axis. This would result in a chamber with a substantially U-shaped cross-section, with the connecting part between the two legs, i.e., the fluid connection, curving around the aforementioned curvature center. The fluid medium, upon undergoing displacement in the chamber, can be forced into one leg or the other of the U-shaped chamber, depending on the effective direction of the torsional vibration. Correspondingly large displacement movements of the fluid medium from a central position are possible.

At the other extreme, the chamber can be rotated by 90° relative to the above arrangement, so that the chamber extends parallel to the rotational axis of the centrifugal mass device. In this case, even if the chamber has a curvature and the curvature center is also rotated by 90°, the pendulum action of the fluid medium is lost. The fluid medium, upon introduction of torsional vibrations, thus executes movements in the circumferential direction of the chamber. It has been found that in this case the absorption effect is no longer oriented to a certain order, but rather to a certain frequency. The fluid medium in the chamber thus performs the function of a speed-proportional viscous damping device. In such cases, the use of a medium with high viscosity is attractive, because this improves the damping properties.

If both of the above advantageous properties of the mass-bearing compensating system according to the invention are required, i.e., the absorption as well as the damping properties, it is possible to embody the chamber in the component of the centrifugal mass device in an inclined fashion. Specifically, the chamber is embodied on an extension axis that runs at a predeterminable angle relative to a radial axis, which itself runs perpendicular to the rotational axis of the centrifugal mass device.

The seal of the chamber is of essential importance. It is conceivable, for example, to place a cover plate on the chamber and to secure the cover plate by means of a clamping ring that encircles the cover plate as well as the component holding it. An absolute seal can be attained by means of sealing elements arranged between the cover plate and the chamber, e.g., in the form of O-rings. The aforementioned clamping ring can also consist of a shrunken-on toothed ring, which can be brought into active connection with a starter pinion in a known manner.

A different type of seal can be embodied by locating the chamber on an axial side of a component of the centrifugal mass device and establishing the seal by means of another component, which serves to connect the centrifugal mass device to the drive, for example, or to its crank shaft, and to which, therefore, the component that accommodates the chamber must be attached. Such a component in the form of a flange can be, given an axially flexible embodiment, a so-called flex plate, by means of which axial vibrations produced by the crank shaft can be kept away from the centrifugal mass device. Of course, it is also possible to provide sealing elements to seal the chamber between a flex plate of this type and an adjacent component accommodating the chamber, which sealing elements are axially effective.

As noted above, the essential task of the chamber can be a damping function. Given a suitable embodiment of the chamber, the damping function can be improved, for example, by the provision of flow constrictions that act as chokes during the flow-through of the fluid medium. Even greater influence can be exercised by equipping at least some of these flow constrictions with a valve, because the latter, presuming a spring-loaded mass thereupon, for example, can be used change the flow cross-section of the flow constriction depending on the centrifugal force and thus on the speed of the centrifugal mass device.

Even greater influence can also be exerted by means of the fluid itself. For example, a dilatal fluid can be used, which increases its dynamic viscosity discontinuously starting at a limit shear velocity, e.g., at high rotational accelerations. The use of rheological fluids is also conceivable, which can have magneto-rheological or electro-rheological properties and can change their dynamic viscosity upon application of a magnetic or electric field. That is, when a suitable variable-strength field is applied to one or more chambers, it is possible, depending on the operating conditions at the drive (which can be detected, for example, by a sensor), to present the function of an absorber or the function of a damper or the function of both in combination.

It is especially advantageous, according to the invention, to provide the chamber in a closed capsule, which can subsequently be attached to a component provided for this purpose, such as a centrifugal mass or a pressure plate in a clutch housing, by means of rivets or screws, for example. When an opening for this capsule is provided on a component of the centrifugal mass device, no additional structural space is required. However, to reduce costs, the capsule can be directly mounted on the component in question. For the purpose of filling, the capsule preferably has a filling opening, which can be closed by means of a closure, e.g., a welded closure. Because of the very simple and compact structure of the mass-bearing compensating system, this system can advantageously be combined, according to the invention, with a torsional vibration damper having a damping device to reduce conveyed torsional vibrations. This damping device can be provided on a clutch disk; however, to support the advantageous damping properties of such torsional vibration dampers, a so-called two-mass flywheel embodied with two centrifugal masses rotatable relative to each other is also conceivable.

The measure of filling the chamber not only with the fluid medium, but also with a compressible medium under an overpressure, serves to a spring that, depending on the strength of the compression, provides a greater or lesser prestress. The intrinsic frequency of the fluid vibration system depends on the rigidity of the spring formed in this manner.

According to the invention, it is also possible to provide a damping element in at least one closure-side end of one of the chamber parts. This damping element has sealing means, which separate the closure-side end of the chamber part from the remainder of the chamber part, and also has a deformation element. The deformation part is preferably a spring, but can also take the form of a compressible medium. The separation of this compressible medium from the medium in the remainder of the chamber part is carried out by the aforementioned sealing means. By means of this damping element, a stop damping can be formed, as a result of which even greater influence can be exerted on the intrinsic frequency of the fluid vibration system.

Preferably, the chamber parts of the chamber extend substantially toward the rotational axis of the given component. This ensures that the border surfaces of the swinging fluid medium always run parallel to the cross-section of the chamber part in question. The mixture of the fluid medium with the compressible medium is made more difficult as a result. At the same time, centrifugal force acts perpendicularly on the border surfaces of the fluid medium.

The creation of a compensating connection between different chamber parts of the chamber prevents the development of overpressure or underpressure in the respectively fluid-free areas of the chamber parts. As a result, the swing angle of the fluid medium is largely uninfluenced, regardless of the effective direction of the conveyed vibration.

It is possible to fill the chamber parts of the chamber with solid bodies having, for example, a spherical shape. Arranging the solid bodies in the fluid medium causes the solid bodies to become lubricated, so that only minimal wear occurs between these bodies and the chamber wall. To achieve a high absorption effect, the solid bodies should have high mass.

When the chamber parts of the chamber are embodied according to the invention with elastic end stops for the solid bodies, the intrinsic frequency of the vibration system can be altered via the rigidity of these end stops. A similar effect can be achieved when the respective final solid bodies facing the closure-side end of each chamber part have at least one elastic area or are made completely of elastic material.

When the solid bodies have different masses, an asymmetrical arrangement of these bodies is established under the effect of centrifugal force. For this reason, it is especially advisable to use solid bodies of different masses in the chamber when, for design reasons, it is not possible to arrange the chamber symmetrically relative to a plane running perpendicular to the rotational axis. In this way, chamber parts of varying length can be realized, as can a chamber rotated around an axis parallel to the rotational axis, because vibration angles of the same length in both vibration directions are nonetheless possible, given different mass, due to centrifugally-induced position shifts of the solid bodies. The different masses can be obtained in various ways, e.g., by means of different densities, sizes or geometries of the solid bodies.

Of course, the mass-bearing compensating system according to the invention is also conceivable in the torque transmission path of a hydrodynamic torque converter, preferably, in this case, in the area of a torsional vibration damper on a bridge coupling. Because such an arrangement would change nothing in the structural embodiments, a solution of this type will not be discussed in greater detail.

The various features of novelty which characterize the invention are pointed out with particularity in the claims annexed to and forming a part of the disclosure. For a better understanding of the invention, its operating advantages, and specific objects attained by its use, reference should be had to the drawing and descriptive matter in which there are illustrated and described preferred embodiments of the invention.

DETAILED DESCRIPTION OF THE PREFERRED EMBODIMENTS

Figure 1:
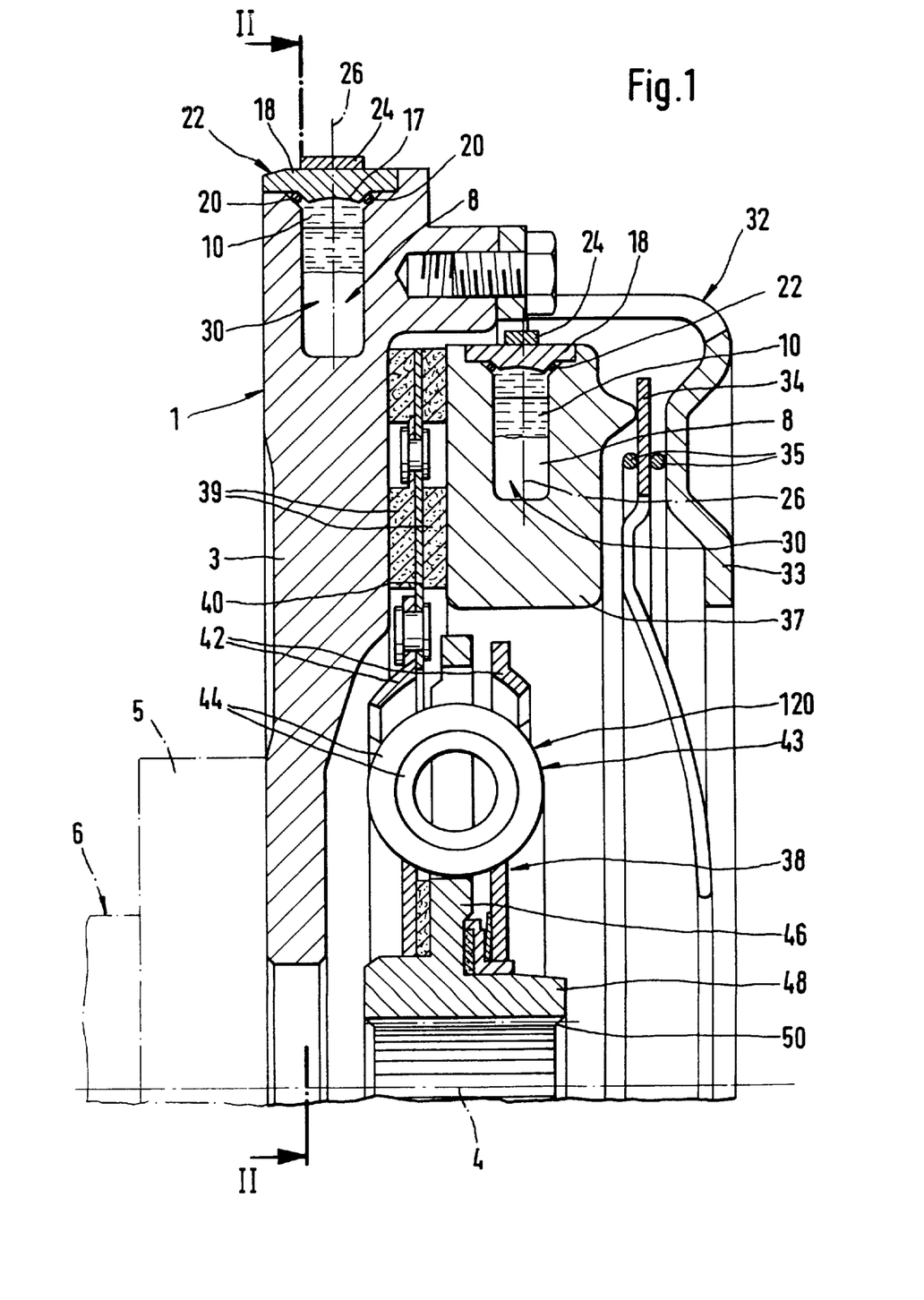
FIG. 1 is a section through a centrifugal mass device with a centrifugal mass and, attached thereto, a clutch housing with a pressure plate and a clutch disk between the pressure plate and the centrifugal mass, whereby the centrifugal mass as well as the pressure plate has a mass-bearing compensating system and the clutch disk has a damping device.
Figure 2:
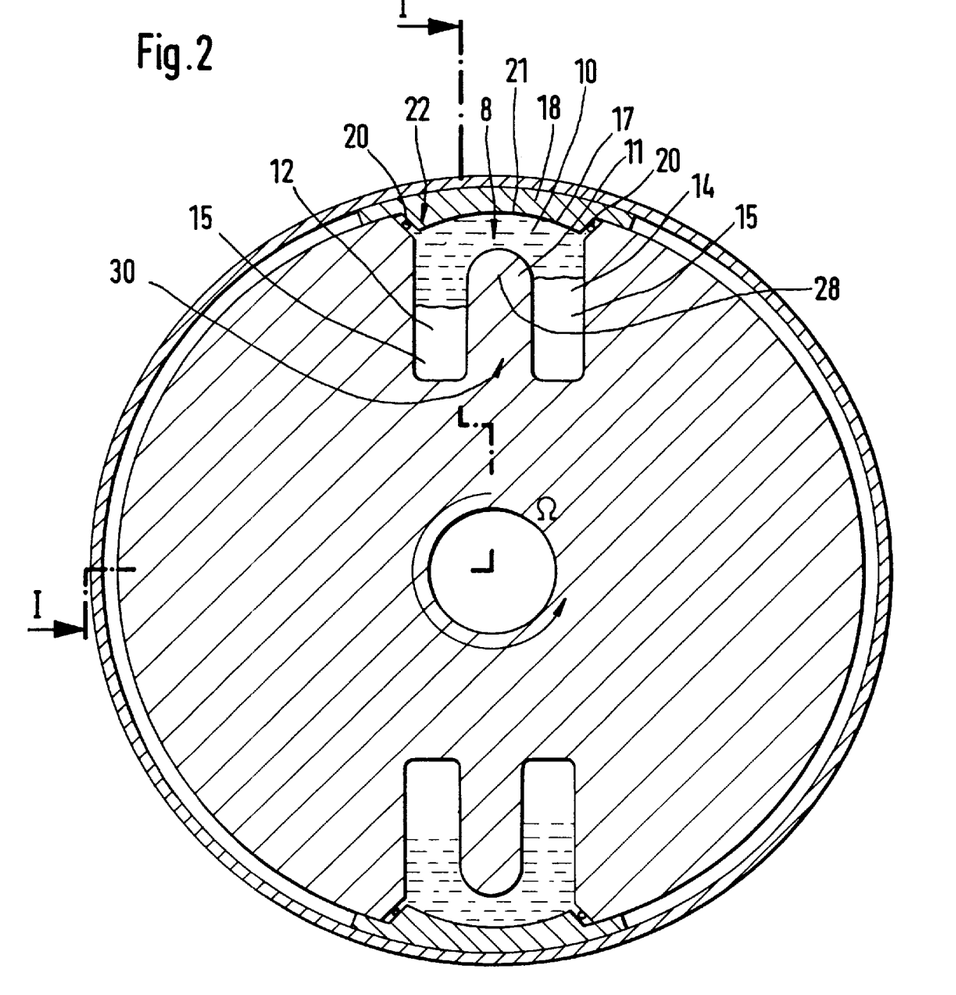
FIG. 2 is a side view of the centrifugal mass in FIG. 1 along line II—II.

FIG. 1 shows a centrifugal mass device 1 with a centrifugal mass 3 that is attached, in a manner not shown, to a crank shaft 5 of a drive 6. The centrifugal mass 3 is rotatable around a rotational axis 4. The centrifugal mass 3 has, in the radially outer area, a chamber 8, whose shape is shown more clearly in FIG. 2. The chamber 8 serves to hold a fluid medium 10. In FIGS. 1 and 2, the fluid medium 10 is shown on the radial outside, because the fluid medium 10 is forced into this position by centrifugal force resulting from the rotating centrifugal mass device 1. According to FIG. 2, the fluid medium 10 assumes a pendulum position around the rotational axis 4, which is influenced by a conveyed torsional vibration in a manner discussed in greater detail below.

Figure 11:
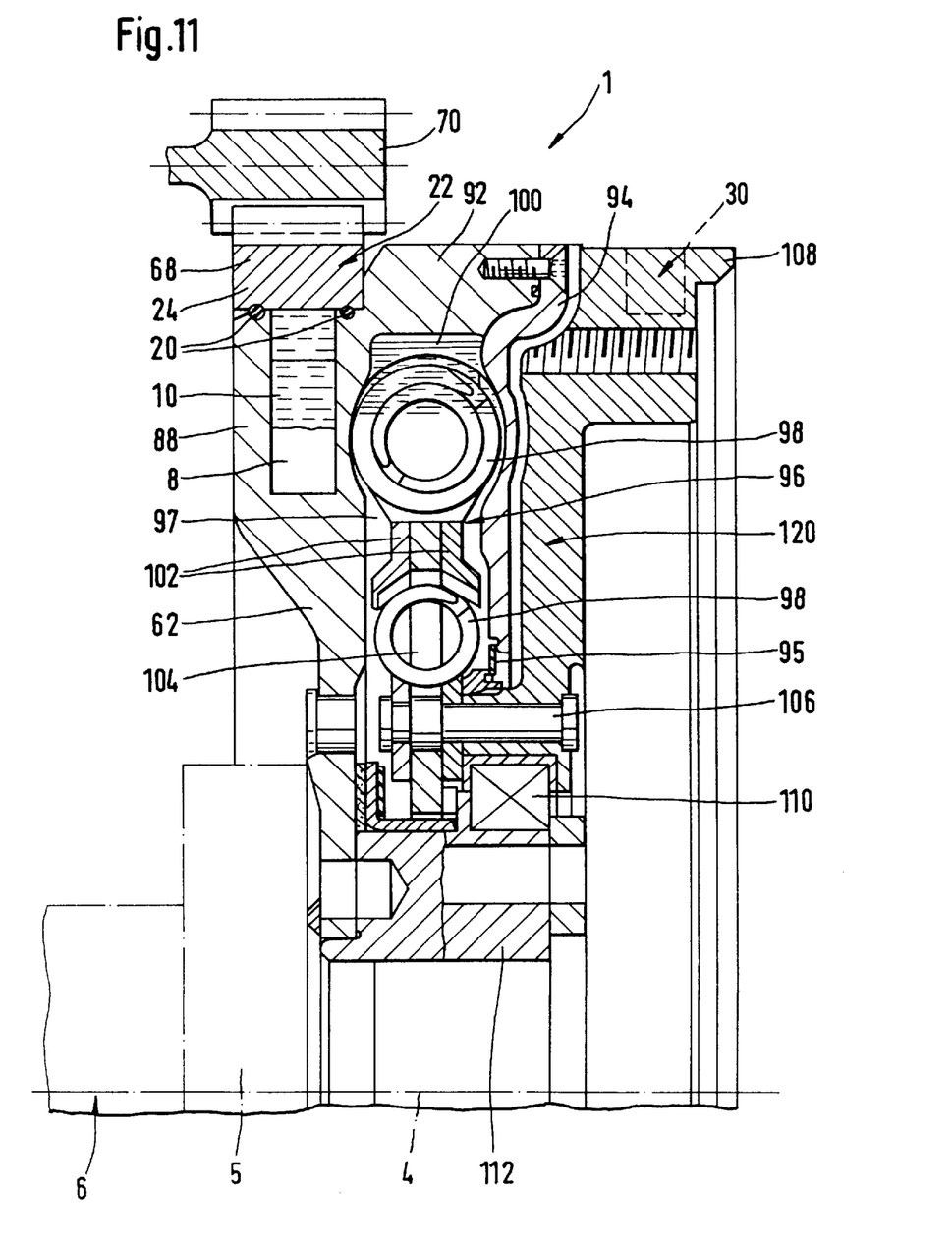
FIG. 11 depicts the mass-bearing compensating system on a centrifugal mass device with two centrifugal masses rotatable relative to each other.

As FIG. 2 shows, it is entirely possible for a plurality of such chambers 8 to be distributed along the circumference. Each of these chambers 8 has, in the circumferential area, a cover plate 18, which in turn is embodied with a sealing element 20, e.g., an O-ring, between the centrifugal mass 3 and the cover plate 18. The cover plate 18 thus acts, in connection with the sealing element 20, as the seal 22 for the chamber 8. The cover plate 18, on its inner side, is embodied with a curvature 21, which extends around a center of curvature 28. Chamber parts 12, 14 run radially inward from this curvature 21 on both sides of a central radial connecting piece 11. Specifically, the chamber parts 12, 14 run radially inward, deviating from a radial orientation by a predeterminable angle, toward the rotational axis 4. In conjunction with the connecting piece 11, the chamber parts 12, 14 and the curvature 21 on the cover plate 18, there results a chamber 8 with a U-shaped cross-section, wherein the chamber parts 12, 14 act as the legs 15 and the curvature 21 acts as the fluid connection 17. It should be mentioned that the cover plate 18 can be fixed in its position by means of a clamping ring 24 that encircles it as well as the centrifugal mass 3. This clamping ring, as shown in FIG. 11, for example, can be replaced by a toothed ring 68, which is shrunk onto the centrifugal mass and can be brought into toothed engagement with a starter pinion 70.

To return to the chamber 8: When a rotational movement is conveyed to the centrifugal mass device 1, the fluid medium 10 shifts radially outward. As soon as torsional vibrations are superimposed on the torque conveyed to the centrifugal mass device 1, the fluid medium 10, due to its inertia, executes the movement relative to the centrifugal mass 3 that is shown in FIG. 2. Because of the arrangement of the chamber 8 on a radial axis 26 (FIG. 1) running perpendicular to the rotational axis 4 and because of the curvature of the fluid connection 17, the fluid medium 10 executes a swinging movement, similar to that of a mechanical pendulum, around the center of curvature 28. The fluid medium 10 thereby escapes from one of the legs 15 and is forced into the other leg 15. In the case of the torsional vibration that has just occurred in FIG. 2, the fluid medium 10, in the chamber 8 located above the rotational axis 4, is forced out of the chamber part 14 into the chamber part 12. Naturally, the opposite occurs in the chamber 8 located below the rotational axis 4.

Because this vibrational behavior of the fluid medium 10 around the center of curvature 28 is comparable to that of a mechanical pendulum with a compensating mass, there is a reduction in a certain order of torsional vibrations. The medium 10 in the chamber 18 thus acts as the mass-bearing compensating system 30, which exercises an absorption function. Because this function is attained substantially by means of the rapid relative displacement between the centrifugal mass 8 and the fluid medium 10, a medium of very low viscosity is preferably used. A very high absorption function is attained when this medium has a high density.

Before further embodiments of the chamber 8 are explained, the other parts of the centrifugal mass device 1 in FIG. 1 will be discussed briefly. The centrifugal mass 3 accommodates, on its side facing away from the crank shaft 5, a clutch housing 33, on which a pressure spring 34 is mounted via rings 35. The pressure spring 34 exerts, in its radially outer area, a pressure force on a pressure plate 37 and, in the radial inner area, can be axially pressurized on flexible tongues by means of a disengaging device, which is embodied in the usual manner and therefore not shown.

The pressure plate 37 acts, via friction linings 39 of a clutch disk 38, on a counter friction surface on the centrifugal mass 3 and, in the radially outer area, is also embodied with a chamber 8, which serves to hold a fluid medium 10. This chamber 8 corresponds in structure and function to the chamber 8 described above in reference to the centrifugal mass 3, so that no additional explanation is necessary here. The essential point is that such a chamber can be suitably accommodated not only by a centrifugal mass, but also by other components of a friction clutch 32, e.g., the pressure plate 37.

The friction linings 39 of the clutch disk 38 are attached to a carrier plate 40, which is in turn attached to cover metal sheets 42, which are rotation-proof relative to one another. In windows, these cover metal sheets 42 accommodate circumferential springs 44, which rest at the other end on a hub disk 46, which is arranged axially between the two cover metal sheets 42 and is also embodied with a window. The hub disk 46 is embodied in one piece with a hub 48, which is connected in rotation-proof fashion via an internal toothing 50 to a gear shaft (not shown). The circumferential springs 44 are part of a damping device 43 that can be activated between the cover metal sheets 42, which act as the input part of a torsional vibration damper 120, and the hub disk 46, which acts as the output part of the torsional vibration damper 120. The friction clutch 32 is formed by the clutch disk 43 in conjunction with the centrifugal mass 3 and the clutch housing 33, including the components accommodated therein, such as the pressure spring 34 and the pressure plate 37.

Figure 3:
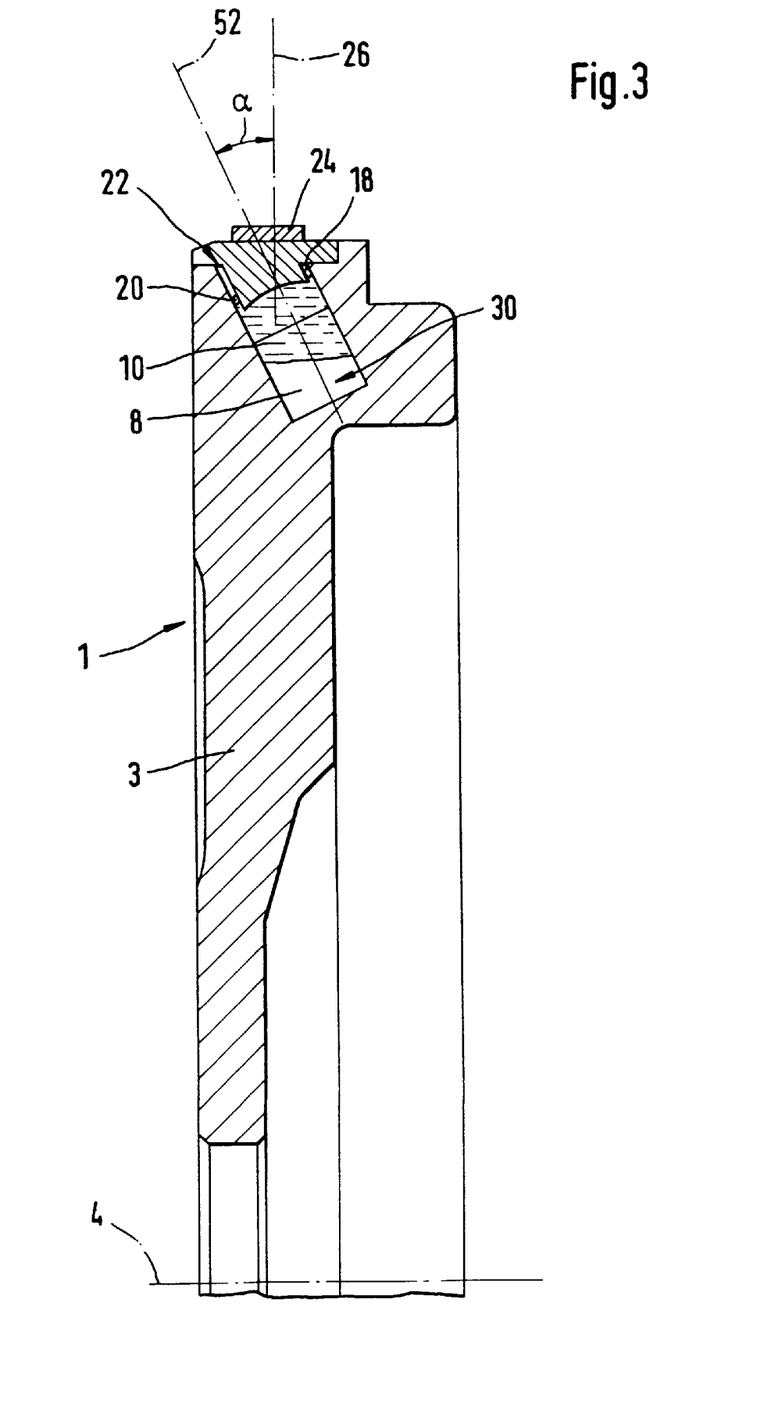
FIG. 3 is a view as in FIG. 1, but with an inclined arrangement of the mass-bearing compensating system (the clutch housing and the clutch disk are not depicted)

FIG. 3 shows a chamber 8, the basic structure of which corresponds to that shown in FIG. 1. The only difference is that this chamber 8 is located on an extension axis 52 that is rotated relative to the radial axis 26 by an angle $\alpha$. Because the chamber 8 is in this different position, the center of curvature 28, with respect to its imaginary rotational axis for the fluid medium 10, is subjected to a change relative to the rotational axis 4. As a result, the fluid medium 10 not only executes swinging movements as described in reference to FIG. 1, but also undergoes a displacement in the circumferential direction in the chamber 8. The absorption function of this mass-bearing compensating system 30 is thus reduced; at the same time, however, its damping function is increased, because the fluid medium 10 behaves at least partially in the manner of a speed-proportional viscous torsional vibration damper. Of course, as needed, this property of the mass-bearing compensating system 30 can be reinforced even further by the use of a fluid medium of higher viscosity. As in the embodiment in FIG. 1, the vibration length depends on the degree of fullness of the fluid medium 10 in the chamber 8.

Figure 4:
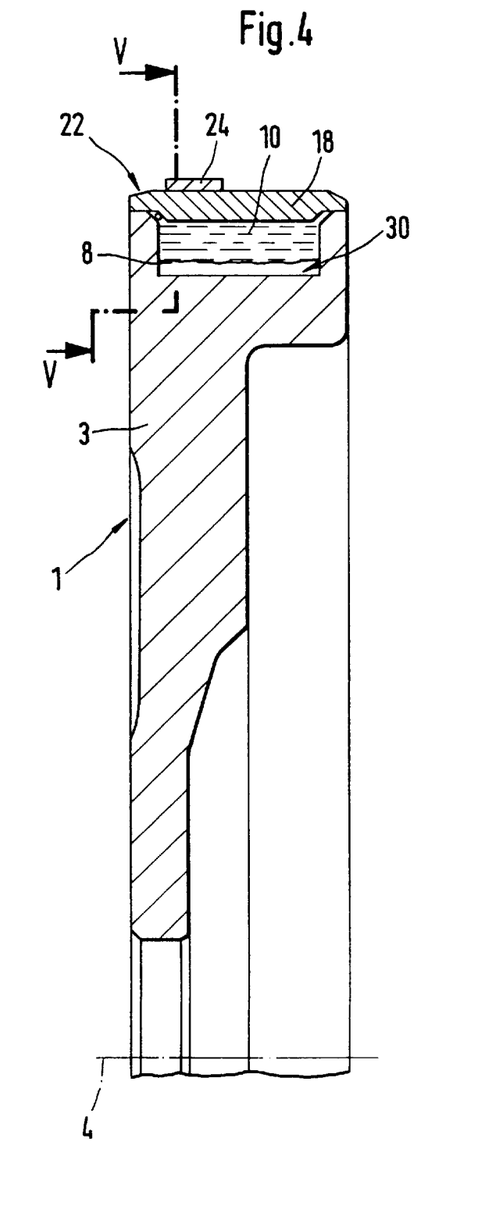
FIG. 4 is a view as in FIG. 3, but with a right-angle arrangement of the mass-bearing compensating system.
Figure 5:
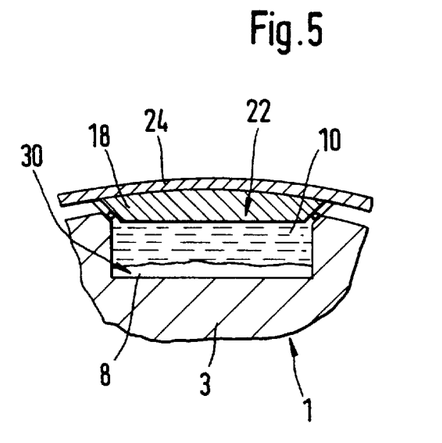
FIG. 5 is a view as along line V—V in FIG. 4.

FIGS. 4 and 5 show a chamber 8 that is rotated by 90° compared to that in FIG. 1. Because of the resultant change in the position of the rotational axis around the center of curvature 28, the fluid medium 10 no long executes any swinging movements around the center of curvature 28. Instead, the fluid medium experiences a displacement almost exclusively in the circumferential direction. A mass-bearing compensating system 30 embodied in this fashion is thus associated only with a damping function, for which reason a chamber with a U-shaped embodiment, as in FIG. 2, can be omitted. Rather, as FIGS. 4 and 5 show, it is enough in this instance to have a roughly cuboid chamber. Here, too, for the sake of better damping properties, a fluid medium of higher viscosity can be used.

Figure 6:
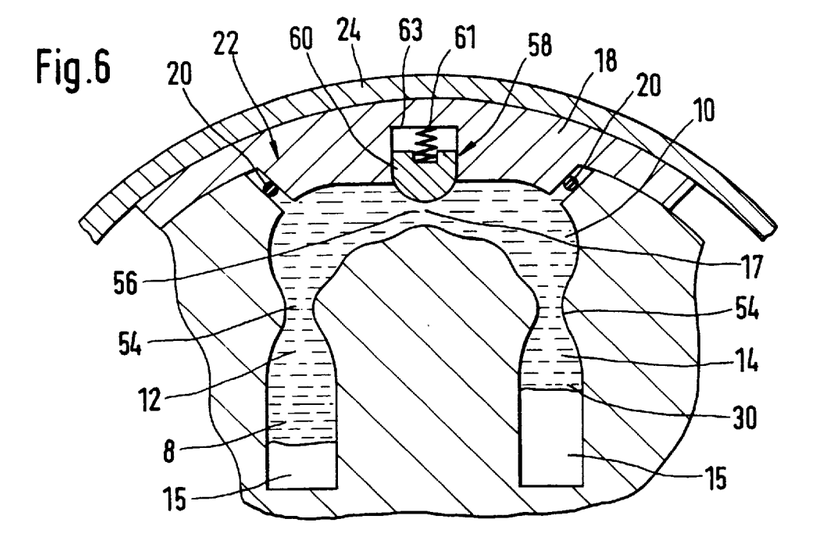
FIG. 6 is an enlarged view of the chamber of the mass-bearing compensating system, with flow constrictions.

The function of speed-proportional viscous damping in the chamber 8 can be improved even further by embodying the chamber with at least one, but preferably with more than one, flow constriction 54, as in FIG. 6. Each of the flow constructions 54 has the effect of a choke, and thus makes vibration of the fluid medium 10 more difficult. Even greater influence on the vibrational behavior can be attained by providing a flow constriction 56, in the extension area of which a valve 58 is located. The valve 58 has, for example, a spring-loaded mass 60, and thus enlarges or constricts the flow cross-section as a function of speed of the centrifugal mass 3. In the arrangement in FIG. 6, the mass 60 extends radially inward and, as speed increases, is moved, under the deformation of the associated spring 61, into the holder 63 provided for the guidance of the mass 60. As a result, the cross-section of the flow constriction 56 is enlarged. Vice versa, a reduced speed results in a reduction of the cross-section.

The enlarged detail of the cover plate 18 in FIG. 6 clearly shows the seal 22 with the sealing element 20. The seal 22 in FIG. 6 acts from the radial outside. In contrast, the seal 22 in FIG. 7 acts in the axial direction and has axial sealing elements 66. For this purpose, the chamber 8 is embodied on the side of the centrifugal mass 3 facing the crank shaft 5 and is held by a primary flange 62, which is attached to the crank shaft 5 by means of attachment elements 65. The primary flange 62 is attached to the centrifugal mass 3 in a manner not shown. This attachment can be carried out, for example, by rivets or screws. It is especially advantageous for the primary flange 62 to be embodied axially elastically and thus act as flex plate 64; in other words, vibrations of the crank shaft 5, which would otherwise act on the centrifugal mass device 1 in the axial direction, are kept away by means of the flex plate 64.

It should be added that a choke can certainly be advantageous even in the arrangement of the chamber 8 in FIGS. 4 and 5.

Figure 7:
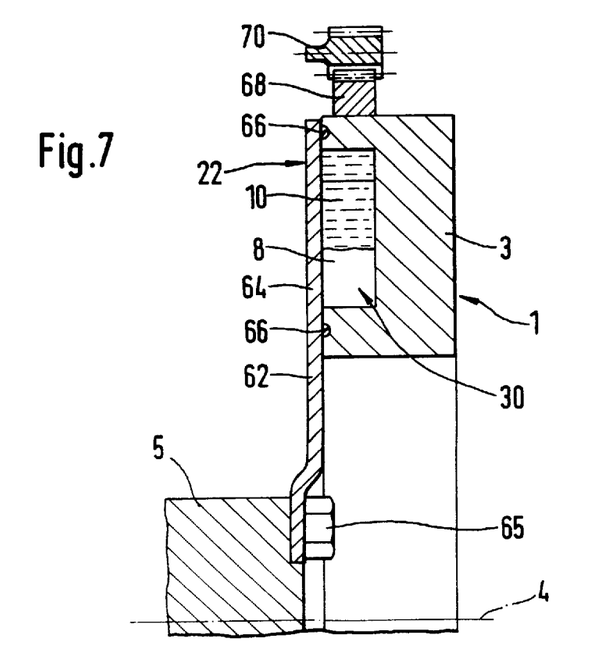
FIG. 7 shows the arrangement of the mass-bearing compensating system on an axial side of a centrifugal mass.

Because the centrifugal mass 3 in FIG. 7 does not need to be sealed radially outward, a toothed ring 68 is used instead of the clamping ring 24. The toothed ring 68 can be brought into active connection with a starter pinion 70.

Figure 8:
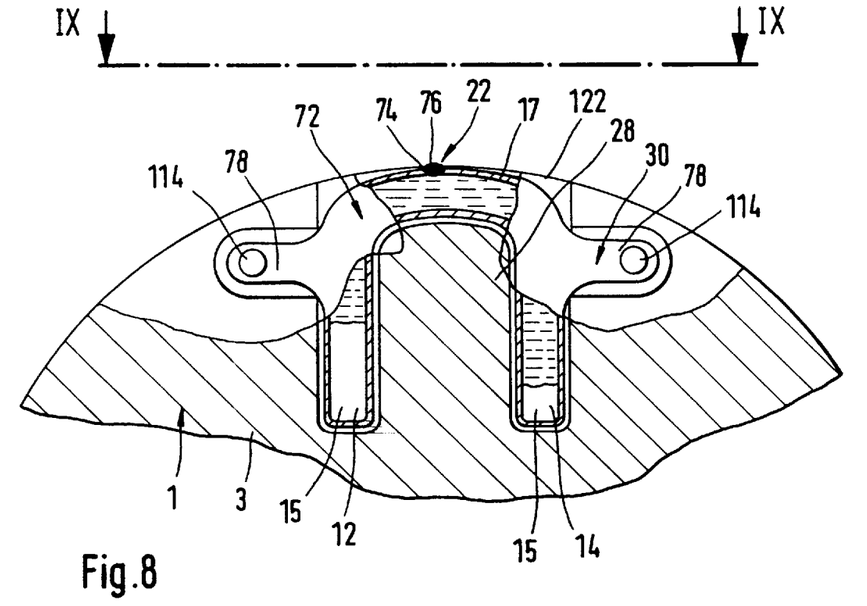
FIG. 8 shows an embodiment of the mass-bearing compensating system in the form of a capsule.
Figure 9:
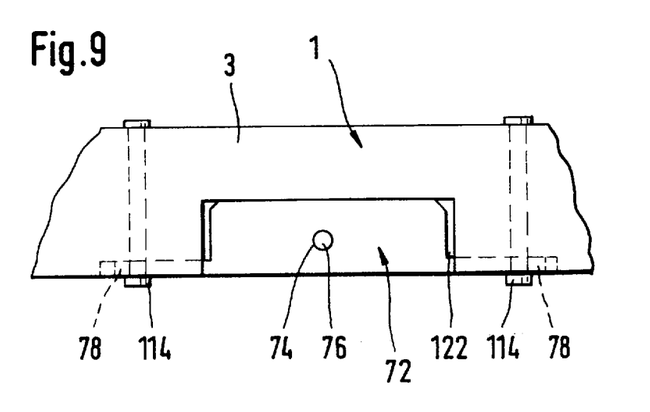
FIG. 9 is a sectional view along line IX—IX in FIG. 8.

In all of the embodiments described above, a recess is provided for the chamber 8 in a centrifugal mass 3 or another component of a friction clutch 32, e.g., a pressure plate 37. In contrast, FIG. 8 shows a closed chamber 8 in the form of a capsule 72, which preferably has a filling opening 74, which is sealed, e.g., by a welded closure 76, after completion of the filling process. The capsule 72 has an attachment flange 78 permitting attachment to the particular component, for example, the centrifugal mass 3, e.g., by means of a riveted joint 114. A screw connection is equally conceivable. In FIGS. 8 and 9, depressions 122 are provided in the centrifugal mass 3 to hold the capsules 72, so that the centrifugal mass can be equipped with a mass-bearing compensating system 30 of this type without requiring more structural space. If structural space, however, is less significant than the greater costs resulting from creating depressions 122 in the centrifugal mass 3, the capsule 72 can be screwed onto the side surface of the centrifugal mass 3, so that the capsule 72 projects axially over the centrifugal mass. It is understandable that the latter embodiment, in particular, is preferred for retrofitting an existing centrifugal mass.

In the embodiments of the chamber in FIGS. 1 to 9, it is also possible to use a dilatal fluid as the fluid medium 10. This dilatal fluid increases its dynamic viscosity in a discontinuous fashion after a limit shear speed, for example, at high rotational accelerations.

Figure 10:
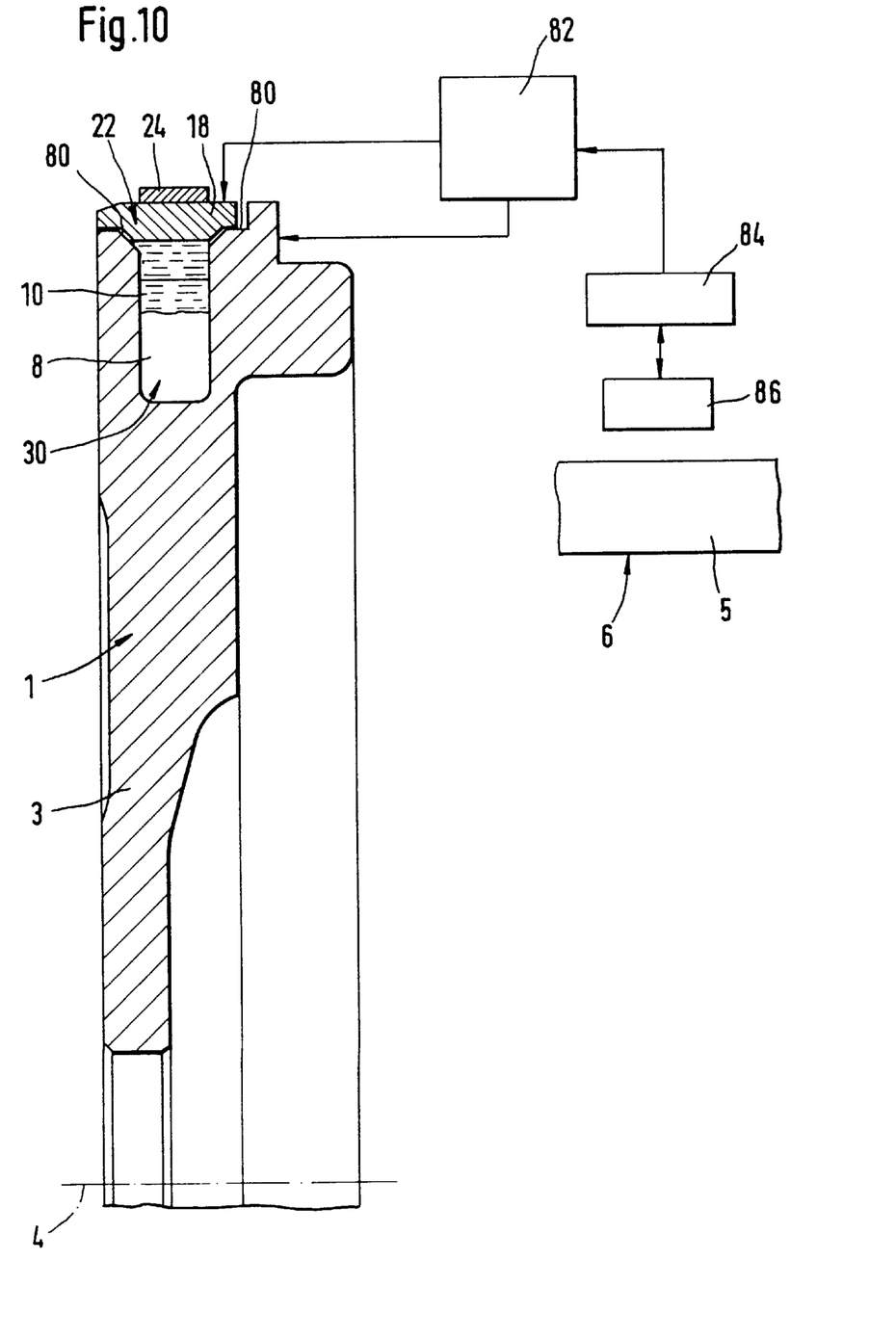
FIG. 10 is a view as in FIG. 1, but without the clutch housing and clutch disk and with electronic components.

FIG. 10 shows the centrifugal mass 3 and the chamber 8, for the most part, as already shown in FIG. 1. However, electric insulation 80 is provided between the centrifugal mass 3, in its circumferential area, and the cover plate 18. The centrifugal mass 3, on the one hand, and the cover plate 18, on the other, are connected to a controllable voltage source 82. The voltage source 82 supplies an electrical field in the extension area of the chamber 8, while the insulation 80 prevents a short circuit between the centrifugal mass 3 and the cover plate 18. The voltage source 82 can be controlled by means of a control device 84, which receives the information for its control functions from a sensor 86, which monitors the movement of the crank shaft 5. The sensor 86 detects torsional vibrations of the crank shaft 5 and thus, via the control device 84, causes an adjustment of the voltage source 82, which in turn leads to an adjustment of the electrical field in the chamber. In interaction with a rheological fluid with which, as a fluid medium, the chamber 8 has been filled, the viscosity of the medium 10 is adjusted in dependence on the electric field and thus on the torsional vibrations at the crank shaft 5, so that the damping behavior attainable by means of the medium 10 is always optimally adjusted to the particular magnitude of the torsional vibration.

It is also possible to use a magneto-rheological fluid, which responds to a surrounding magnetic field. A suitable circuit for establishing such a magnetic field is known in itself, and is therefore not described in greater detail. Such a magnetic field can also be realized by means of a permanent magnet.

In all of the examples described above, the centrifugal mass device 1 is embodied with a single centrifugal mass 3. Deviating from this, FIG. 11 shows a centrifugal mass device 1 with two centrifugal masses 88, 108 rotatable relative to each other. The drive-side centrifugal mass 8 is attached to the crank shaft 5 in a manner not shown and has a primary hub 112, on which the output-side centrifugal mass 108 is arranged via a bearing 110. The drive-side centrifugal mass 88 has a primary flange 62 running radially outward from the primary hub 112, which primary flange 62 undergoes an axial broadening in the radially outer area for the purpose of accommodating the chamber 8 partially filled with the fluid medium 10. The chamber 8, in the circumferential area, is equipped in a manner already described with the seal 22, which is secured by means of a shrink-fitted ring 68. The toothed ring 68 acts in a manner comparable to that of the clamping ring 24 described with reference to the other drawings, i.e., the ring 68 on a radially effective sealing element 20. In the radial outer area, the toothed ring 68 is actively connected to the starter pinion 70.

On the primary flange 62, in its circumferential area, there is a formed-on axial shoulder 92, on which is provided a cover plate 94 running radially inward. The cover plate 94 has, in its radially inner area, a seal 95 relative to the output-side centrifugal mass 108. This seal 95 prevents the outflow of highly-viscous grease contained in a grease chamber 97, which is bordered by the primary flange 62, the axial shoulder 92 and the cover plate 94, and, by means of a damping device 96 arranged in this grease chamber and described in more detail below, brings about viscous damping. In this embodiment, the damping device 96 has two spring sets, which are radially offset relative to each other, with springs 98. The radially outer spring set rests radially outside on the axial shoulder 92 via sliding shoes 100, and can be pressurized by means of control elements, not shown, on the grease chamber side of the primary flange 62 and/or the cover plate 94. The opposite side of the outer spring set rests on cover plates 102 that serve as control elements for the radially inner spring set, which rests on a hub flange 104 attached securely to the drive-side centrifugal mass 108 via a riveted joint 106.

The function of a centrifugal mass device of this type embodied with two centrifugal masses is generally known, for example, from the above-cited German reference DE 36 30 398 A1, and will thus not be discussed in greater detail at this point. This centrifugal mass device would also act advantageously as the torsional vibration damper 120 if there were only one spring set, instead of two radially offset spring sets, and this one spring set rested at one end on the primary flange 62 and the cover plate 94 and at the other end on the hub disk 104.

In contrast, in the centrifugal mass device in FIG. 11, it is essential that at least one chamber 8 with fluid medium 10 be contained in at least one of the centrifugal masses, preferably the drive-side centrifugal mass, and that the chamber 8 preferably be arranged so as to perform an absorption function, as described in detail with respect to FIG. 1. The embodiment of the mass-bearing compensating system 30 as an absorber must thus take precedence over the damping function, because the centrifugal mass device 1, seen as a whole, already has a very effective torsional vibration damper 120 with a damping device 96. Of course, the compensating system 30 could, as indicated in the broken lines, be arranged in the output-side centrifugal mass 108. However, the arrangement in the drive-side centrifugal mass 88 is more advantageous, because then, thanks to the absorption function or, as applicable, the damping function of the mass-bearing compensating system 30, it is already possible to filter out or damp the most disturbing order (or orders, given a plurality of different chambers 8) on the drive side, before a corresponding torsional vibration is transmitted to the damping device 96 of the torsional vibration damper 120.

Of course, this centrifugal mass device, too, is part of friction clutch 32, whereby a clutch housing 33 is attached to the output-side centrifugal mass 108. This friction clutch 32 can also have a mass-bearing compensating system 30, for example, in the pressure plate 37.

Figure 12:
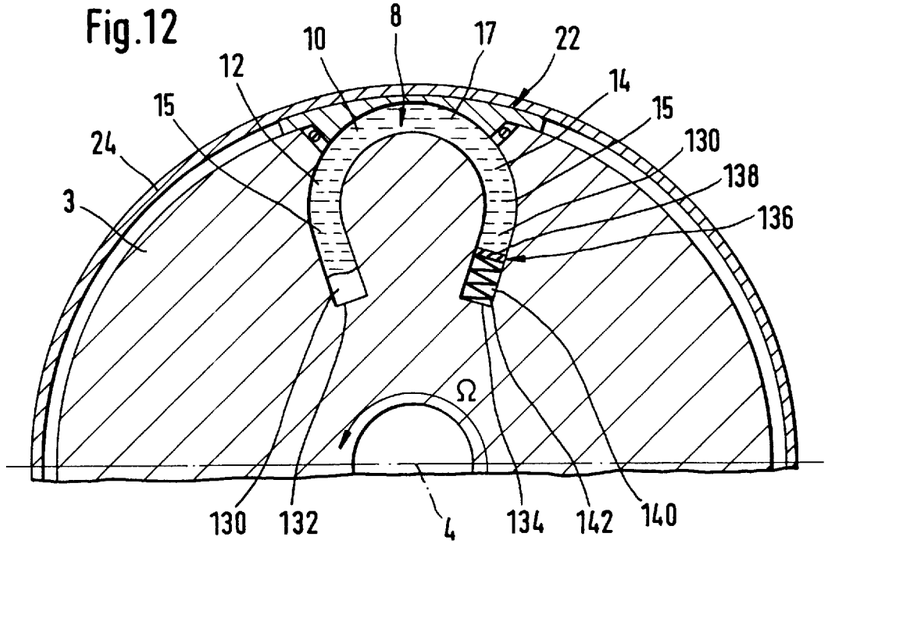
FIG. 12 is a view as in FIG. 2, but with a pressurized compressible medium in the mass-bearing compensating system.

FIG. 12 shows the chamber 8 with the chamber parts 12, 14 and a fluid connection 17. All together, a horseshoe shape is created, and the respective closure-side ends 132, 134 of the chamber parts 12, 14 are directed toward the rotational axis 4 of the centrifugal mass 3. For example, as shown on the right in the drawing, the closure-side end 134 of the chamber 14 can be associated with a damping element 136, which has sealing means 138 and a deformation element 140 in the form of a spring 142. The spring 142 rests with its side facing away from the sealing means 138 on the closure-side end 134 of the chamber 14 and serves to dampen impacts transmitted by the fluid medium 10 in the chamber 8, in swinging movements, to the sealing means 138. The same purpose can be served by a compressible medium 130, which consists, for example, of air introduced into the chamber 8 at an overpressure, as shown, for example, on the left in the drawing. The compressible medium 130 as well as the damping element 136 can be used to influence the intrinsic frequency of the vibrations in the mass-bearing compensating system.

Of course, if the spring 142 is to be omitted, the damping element 136 can contain a compressible medium (not shown) as a deformation element 140, whereby this compressible medium is separated from the medium 10 by the sealing means 138.

The horseshoe-shaped chamber itself, even without such damping means, is also advantageous with respect to vibration.

Figure 13:
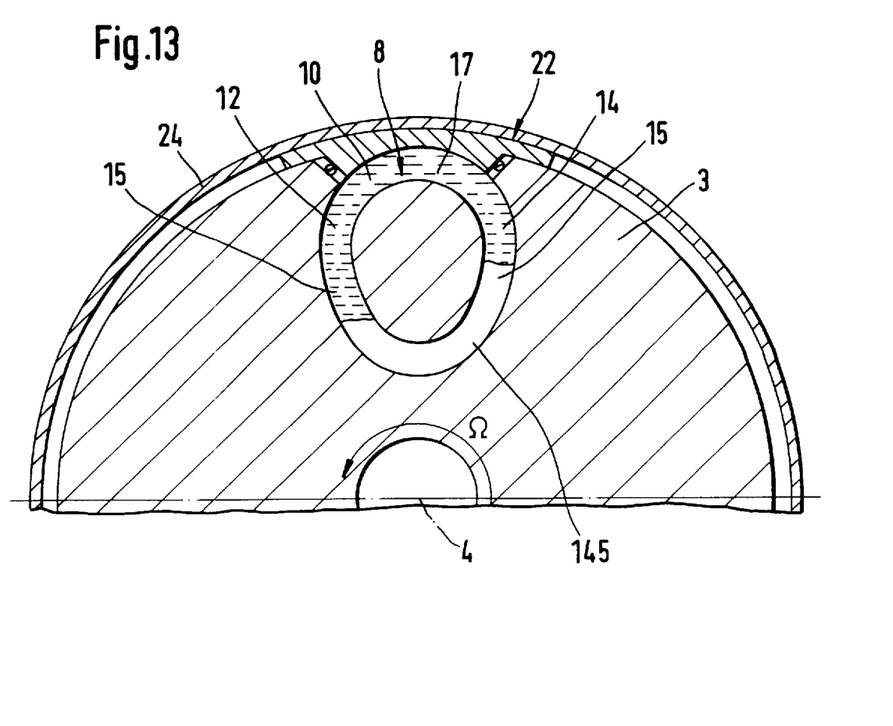
FIG. 13 is a view as in FIG. 2, but with a compensating connection between different chamber parts of the mass-bearing compensating system.

FIG. 13 shows a chamber 8 that has, in the radially inner area, a compensating connection 145 between the chamber parts 12, 14. Upon introduction of very large vibrations, the fluid medium 10 can shift into the other respective chamber part 12, 14.

Figure 14:
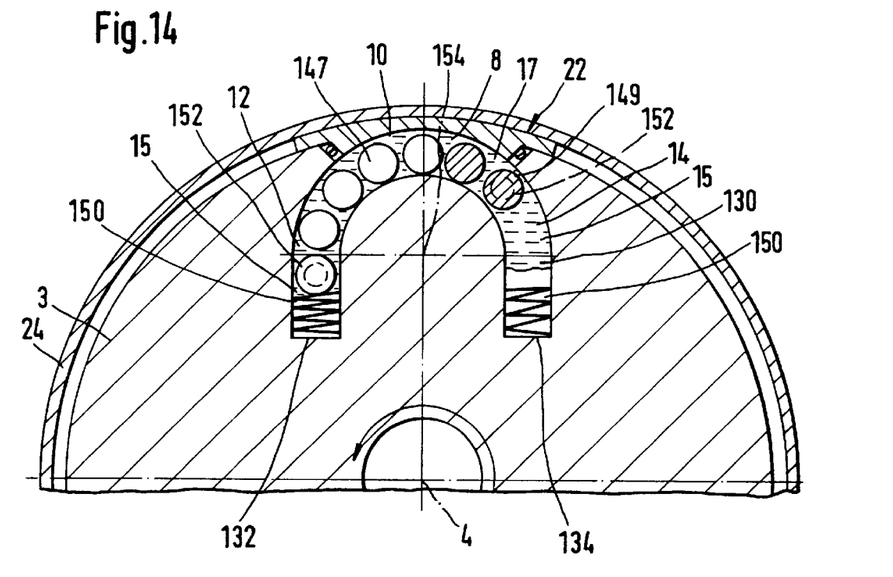
FIG. 14 is a view as in FIG. 2, but with elastic end stops for solid bodies in the mass-bearing compensating system.
Figure 15:
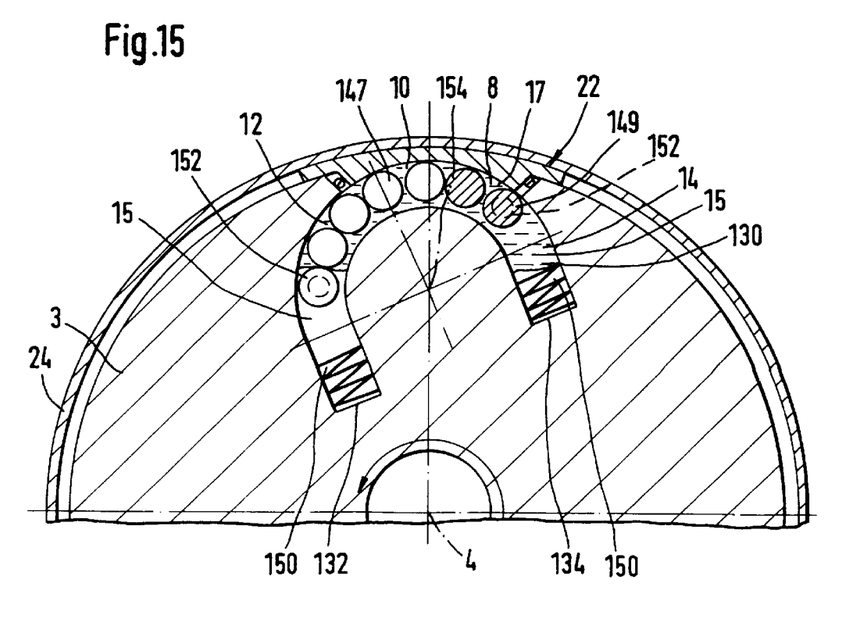
FIG. 15 is a view as in FIG. 14, but with a rotated chamber of the mass-bearing compensating system.

FIG. 14 shows a chamber 8 that is filled with solid bodies, which are preferably spherical in shape. In the embodiment shown, solid bodies 147 of lower density and solid bodies 149 of higher density are used. The higher-density solid bodies 149 are identified by hatching, in contrast to the other solid bodies 147. The solid bodies 147, 149, because of their different densities, are distributed under the influence of centrifugal force as shown, for example, in FIG. 14. This measure is specifically used, for example, when design constraints require the chamber 8 to be installed rotated around an axis 154 parallel to the rotational axis 4, as shown in FIG. 15. In this case, despite the rotated installation position, the solid bodies 147, 149 have equal distances to travel to the given closure-side end 132, 134 of the chamber parts 12, 14. As a result, the symmetry required for displacement movements in both rotational directions is attained.

The installation of an elastic end stop 150 on at least one of the closure-side ends 132, 134 makes it possible to dampen the impact of the collision of the solid bodies 147, 149, at the same time, it is possible to influence the intrinsic frequency of the vibration system through the rigidity of a particular end stop. Each elastic end stop 150 can be combined with at least one adjacent solid body 147 or 149, which can have at least one elastically deformable area 152. This 152 area is shown in FIG. 14 between the outer and the inner radii of the respective solid bodies 147, 149. Of course, the solid bodies 147, 149 could also be embodied completely elastically and could serve as a substitute for the elastic end stop 150.

The invention is not limited by the embodiments described above which are presented as examples only but can be modified in various ways within the scope of protection defined by the appended patent claims.

We claim:

1. A friction clutch for a motor vehicle with an inertial mass device, comprising:

a driving part;

a driven part;

means for selectively engaging the driven and driving parts, the engaging means including a clutch housing, a pressure spring, a pressure plate and a clutch disk;

a mass-bearing compensating system, the compensating system including a chamber provided in the pressure plate; and a fluid medium arranged in the chamber to a predetermined degree of fullness so that the position of the fluid in the chamber changes when a torsional vibration occurs, so that the fluid medium acts as a fluid stabilizing mass, whereby an effect resulting from the position change depends on:

density and viscosity of the fluid medium;

arrangement of the chamber relative to a rotational axis of the inertial mass device which determines vibrational behavior of the medium;

chamber shape, which determines the displacement resistance; and degree of fullness of the chamber.

2. A friction clutch as defined in claim 1, wherein the chamber has a plurality of chamber parts which are connected to one another by a fluid connection having a predeterminable curvature around a center of curvature.

3. A friction clutch as defined in claim 2, wherein the center of curvature of the fluid connection is located on a radial axis which runs perpendicular to the rotational axis of the inertial mass device, at a predetermined radial distance from the rotational axis.

4. A friction clutch as defined in claim 3, wherein the fluid connection is curved and radially outside the chamber, the chamber being configured to have, on a plane that runs perpendicular to the rotational axis, a substantially U-shaped cross-section with legs which form the chamber parts and extend radially inward from the fluid connection at a predetermined angle relative to a radial axis of the component of the inertial mass device.

5. A friction clutch as defined in claim 1, wherein the chamber is partially filled with the fluid medium.

6. A friction clutch as defined in claim 1, wherein the fluid medium is a dilatal fluid.

7. A friction clutch as defined in claim 1, and further comprising a seal arranged to close the chamber in a radially outer region.

8. A friction clutch as defined in claim 7, wherein the chamber has a plurality of chamber parts, the seal being arranged to act as an outerlying curved fluid connection between the chamber parts.

9. A friction clutch as defined in claim 7, and further comprising a cover plate arranged on the chamber and a clamping ring that encircles the pressure plate device and clamps the cover plate on the chamber so as to secure the seal in position.

10. A friction clutch as defined in claim 8, wherein the seal includes sealing elements between itself and associated components of the pressure plate.

11. A friction clutch as defined in claim 1, wherein the seal includes a cover plate that is one of welded, glued and sprayed to the pressure plate that accommodates the chamber.

12. A friction clutch as defined in claim 1, wherein the seal comprises a cover plate that surrounds and positively engages the pressure plate that accommodates the chamber.

13. A friction clutch for a motor vehicle with an inertial mass, comprising:

a driving part;

a driven part;

means for selectively engaging the driven and driving parts;

a mass-bearing compensating system which includes a chamber provided in at least one component of the inertial mass;

a fluid medium arranged in the chamber to a predetermined degree of fullness so that the position of the fluid in the chamber changes when a torsional vibration occurs so that the fluid medium acts as a fluid stabilizing mass, whereby an effect resulting from the position change depends on:

density and viscosity of the fluid medium, arrangement of the chamber relative to a rotational axis of the inertial mass which determines vibrational behavior of the medium, chamber shape, which determines the displacement resistance, and degree of fullness of the chamber; and a seal arranged to close the chamber in a radially outer region, the chamber having a plurality of chamber parts and the seal being arranged to act as an outerlying curved fluid connection between the chamber parts.

14. A friction clutch for a motor vehicle with an inertial mass, comprising:

a driving part;

a driven part;

means for selectively engaging the driven and driving parts;

a mass-bearing compensating system which includes a chamber provided in at least one component of the inertial mass;

a fluid medium arranged in the chamber to a predetermined degree of fullness so that the position of the fluid in the chamber changes when a torsional vibration occurs so that the fluid medium acts as a fluid stabilizing mass, whereby an effect resulting from the position change depends on:

density and viscosity of the fluid medium, arrangement of the chamber relative to a rotational axis of the inertial mass which determines vibrational behavior of the medium, chamber shape, which determines the displacement resistance, and degree of fullness of the chamber;

a seal arranged to close the chamber in a radially outer region;

a cover plate arranged on the chamber; and a clamping ring that encircles the component of the inertial mass and clamps the cover plate on the chamber so as to secure the seal in position.

15. A friction clutch for a motor vehicle with an inertial mass, comprising:

a driving part;

a driven part;

means for selectively engaging the driven and driving parts;

a mass-bearing compensating system which includes a chamber provided in at least one component of the inertial mass;

a fluid medium arranged in the chamber to a predetermined degree of fullness so that the position of the fluid in the chamber changes when a torsional vibration occurs so that the fluid medium acts as a fluid stabilizing mass, whereby an effect resulting from the position change depends on:

density and viscosity of the fluid medium, arrangement of the chamber relative to a rotational axis of the inertial mass which determines vibrational behavior of the medium, chamber shape, which determines the displacement resistance, and degree of fullness of the chamber; and a seal arranged to close the chamber in a radially outer region, the seal including a cover plate that is one of welded, glued and sprayed to the component of the inertial mass that accommodates the chamber.

16. A friction clutch for a motor vehicle with an inertial mass, comprising:

a driving part;

a driven part;

means for selectively engaging the driven and driving parts;

a mass-bearing compensating system which includes a chamber provided in at least one component of the inertial mass;

a fluid medium arranged in the chamber to a predetermined degree of fullness so that the position of the fluid in the chamber changes when a torsional vibration occurs so that the fluid medium acts as a fluid stabilizing mass, whereby an effect resulting from the position change depends on:

density and viscosity of the fluid medium, arrangement of the chamber relative to a rotational axis of the inertial mass which determines vibrational behavior of the medium, chamber shape, which determines the displacement resistance, and degree of fullness of the chamber; and a seal arranged to close the chamber in a radially outer region, the seal comprising a cover plate that surrounds and positively engages the component that accommodates the chamber.

* * * * *